(12) United States Patent
Ranellucci

(10) Patent No.: US 11,588,640 B2
(45) Date of Patent: Feb. 21, 2023

(54) METHOD FOR PERFORMING A PREPROCESSING COMPUTATION DURING A PROACTIVE MPC PROCESS

(71) Applicant: Coinbase IL RD Ltd., Oakland, CA (US)

(72) Inventor: Samuel Ranellucci, Petah Tiqva (IL)

(73) Assignee: Coinbase IL RD Ltd., Oakland, CA (US)

(*) Notice: Subject to any disclaimer, the term of this patent is extended or adjusted under 35 U.S.C. 154(b) by 337 days.

(21) Appl. No.: 16/857,202

(22) Filed: Apr. 24, 2020

(65) Prior Publication Data

US 2021/0336790 A1 Oct. 28, 2021

(51) Int. Cl.
*H04L 9/32* (2006.01)
*H04L 9/08* (2006.01)

(52) U.S. Cl.
CPC ............ *H04L 9/3226* (2013.01); *H04L 9/085* (2013.01); *H04L 2209/46* (2013.01)

(58) Field of Classification Search
CPC .... H04L 9/3226; H04L 2209/46; H04L 9/085
USPC ...................................................... 713/168
See application file for complete search history.

(56) References Cited

U.S. PATENT DOCUMENTS

| | | | | |
|---|---|---|---|---|
| 9,077,539 B2* | 7/2015 | Kamara | .................. | H04L 9/0816 |
| 10,230,724 B2* | 3/2019 | Bringer | ............... | H04L 63/0442 |
| 2006/0143453 A1* | 6/2006 | Imamoto | ............... | H04L 9/3273 |
| | | | | 713/169 |
| 2009/0154707 A1* | 6/2009 | Lee | ........................ | H04N 7/15 |
| | | | | 380/278 |
| 2011/0055585 A1* | 3/2011 | Lee | ...................... | H04L 9/3218 |
| | | | | 713/183 |
| 2016/0335440 A1* | 11/2016 | Clark | ...................... | H04L 9/085 |
| 2017/0012948 A1* | 1/2017 | Peeters | ................. | H04L 9/3247 |
| 2018/0309571 A1* | 10/2018 | Arora | .................. | H04L 63/0435 |
| 2019/0036678 A1* | 1/2019 | Ahmed | .................... | H04L 9/302 |
| 2020/0044863 A1* | 2/2020 | Yadlin | ...................... | G06F 21/44 |

OTHER PUBLICATIONS

Michael J. Rosulek, The Structure of Secure Multi-Party Computation (Year: 2003).*

* cited by examiner

*Primary Examiner* — Cheng-Feng Huang
(74) *Attorney, Agent, or Firm* — Perkins Coie LLP

(57) ABSTRACT

The subject matter discloses computer-implemented method performed during a multi-party computation (MPC) process performed between multiple parties, said method comprising, the multiple parties executing a pre-processing phase and obtain values of correlated random variables to be used in an MPC process, the parties periodically verifying the correctness of the correlated random variables by exchanging information between the multiple parties, refreshing the values of the correlated random variables in each of the multiple parties, wherein no party of the multiple parties has access to values of the correlated random variables stored in another party of the multiple parties during the verifying and refreshing processes, the multiple parties using the correlated random variables during the MPC process after verifying a correctness of the correlated random variables.

19 Claims, 3 Drawing Sheets

METHOD FOR PERFORMING A PREPROCESSING COMPUTATION DURING A PROACTIVE MPC PROCESS

FIELD

The present invention relates to the field of performing a multi-party computation process.

BACKGROUND

Secure multi-party computation (also known as secure computation, multi-party computation (MPC), or privacy-preserving computation) is a subfield of cryptography with the goal of creating methods for parties to jointly compute a function over their inputs while keeping those inputs private. Unlike traditional cryptographic tasks, where cryptography assures security and integrity of communication or storage and the adversary is outside the system of participants (an eavesdropper on the sender and receiver), the cryptography in this model protects participants' privacy from each other.

In some cases, the MPC processes involve splitting shares of secrets or cryptographic keys between different parties, and the cryptographic operations are carried out without ever revealing the entire secret or key to any party. This is enabled by exchanging information between the different parties in order to carry out the computation.

In some cases, the MPC process comprises a preprocessing phase, in which the parties interact to generate preprocessing values that may be correlated between the parties, which are later used in the MPC computation, often to speed it up. Such values may thus be defined as correlated random variables. When one or more of the parties is attacked or otherwise controlled by an adversary, the preprocessing values held by that party may be corrupted. This can result in a break of the MPC process run later on that uses the corrupted preprocessing values, even if the attacker is no longer present. Hence, there is a need to verify that the input from the parties is correct and no party is malicious or attacked. In addition, in a setting where the adversary can attack some parties and steal the preprocessing values, and later attack the others during the MPC process, the attacker can break the MPC process. Thus, the preprocessing values need to be refreshed to prevent such an attack, without generating them from scratch (due to the cost involved).

SUMMARY

It is an object of the subject matter to disclose a computer-implemented method performed during a multi-party computation (MPC) process performed between multiple parties, said method comprising the multiple parties executing a pre-processing phase to obtain values of correlated random variables to be used in an MPC process, the parties periodically verifying the correctness of the correlated random variables by exchanging information between the multiple parties, refreshing the values of the correlated random variables in each of the multiple parties, wherein no party of the multiple parties has access to values of the correlated random variables stored in another party of the multiple parties during the verifying and refreshing processes, and the parties use the correlated random variables during the MPC process after verifying a correctness of the correlated random variables.

In some cases, the method further comprising the first party of the multiple parties computing two output values by executing a function, a first output value is an output of the function receiving as input the random vector and a first of the correlated random variables received at the first party and a second output value is an output of the function receiving as input the random vector and a second of the random correlated variables generated in the preprocessing, the first party sending the first output value to the second party and storing the second output value in the first party; the second party performing a proof-validation function having as input the first output value received from the first party and the two values of the random correlated variables generated in the preprocessing MPC phase.

In some cases, the method further comprising verifying that an output of the proof-validation function equals the first output value. In some cases, the method further comprising performing a commitment process between the first party and the second party on the output of the proof-validation function equals the first output value.

In some cases, the method further comprising computing output of the proof-validation function equals the first output value multiple times and verifying that the output of the proof-validation function equals the first output value in each of the multiple times. In some cases, the method further comprising concatenating the multiple outputs of the proof-validation function and the second output value. In some cases, the method further comprising performing a commitment process between the first party and the second party on the concatenation of the multiple outputs of the proof-validation function and the second output value. In some cases, the refreshing of the correlated random variables is performed locally in each of the multiple parties based on a random seed known to each of the multiple parties.

In some cases, the refreshing of the correlated random variables comprising the multiple parties agreeing on a random seed and each party of the multiple parties locally computing new values for the correlated random variables based on the random seed and prior values of the correlated random variables. In some cases, the method further comprising the multiple parties performing an MPC process using the new values for the correlated random variables. In some cases, each party of the multiple parties receives at least two values of correlated random variables.

In some cases, one of the values of the correlated random variables generated in the preprocessing for the first party is an outcome of a function receiving as input two values of correlated random variables generated in the preprocessing for the second party. In some cases, the function comprises multiplying one value stored in each party of the multiple parties and a XOR between the result of the multiplying and another value stored in the second party.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The invention discloses a method of verifying the correctness of random correlated variables stored in multiple parties that participate in a multi-party computation (MPC) process. The random correlated variables may be received from a trusted third party, or be generated during an MPC process performed among the parties without a trusted third party.

The random correlated variables are correlated among the parties to run MPC without revealing the secret, as the secret itself is not revealed nor accessed during the MPC process. The secret may be an authentication bit, a password, a cryptographic key and the like.

The verification of the correctness of the values of the random correlated variables is performed in a periodic manner to verify that the values stored by the parties are correct and will enable performing an MPC process.

If an adversarial entity attacks one of the parties, it may provide incorrect values to the MPC process, thus preventing it from executing a process, such as authenticating a person or a device to a server. Thus, when the values of the random correlated variables are verified, the MPC process is performed properly. In case the adversary does not attack all the parties, it cannot get all the shares of the secret.

Figure 1:
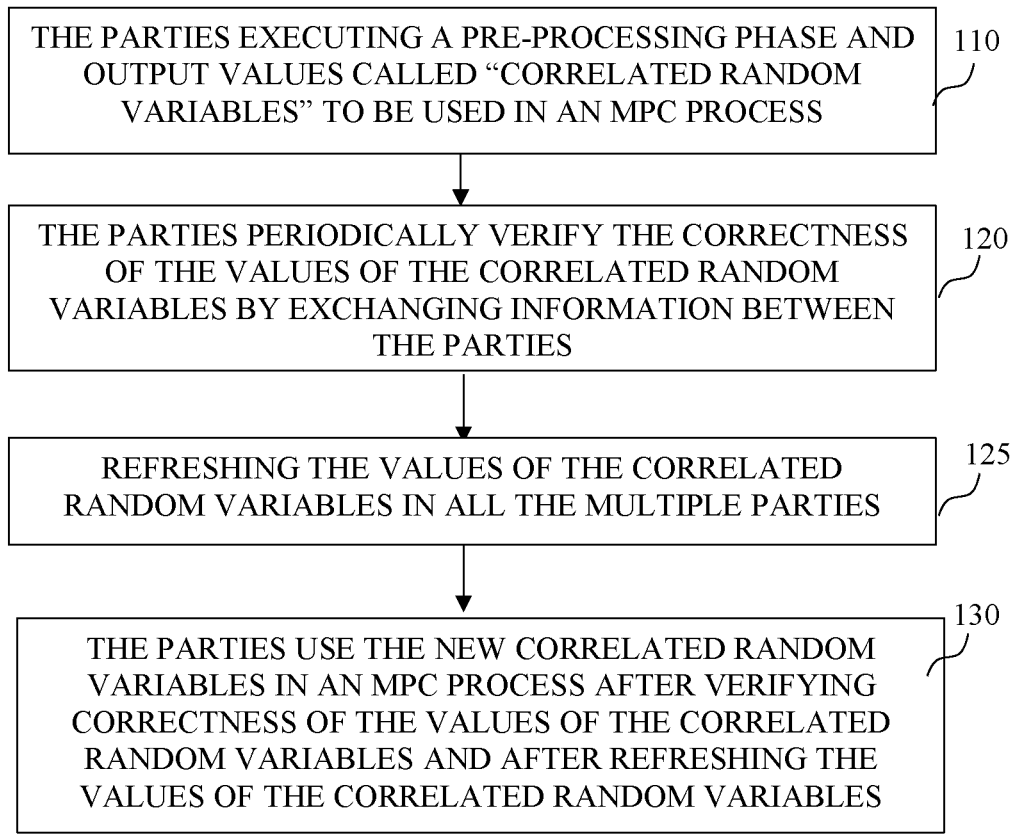
FIG. 1 discloses a computer-implemented method performed during a multi-party computation (MPC) process performed between multiple parties, according to exemplary embodiments of the present invention.

FIG. 1 discloses a computer-implemented method performed during a multi-party computation (MPC) process performed between multiple parties, according to exemplary embodiments of the present invention.

Step 110 discloses the parties executing a pre-processing phase and obtaining values of correlated random variables to be used in an MPC process. The correlated random variables may include at least two different variables for each of the parties. In some exemplary cases, one of the values of the correlated random variables sent to the first party is an outcome of a function receiving as input two values of correlated random variables sent to the second party. For example, the value sent to the first party may be a multiplication of two values of correlated random variables sent to the second party. In some other cases, the value sent to the first party may be a multiplication of two values of correlated random variables sent to the second party multiplied by the other value sent to the first party. The values of the correlated random variables are stored in a memory address in electronic devices in which the parties are stored.

Step 120 discloses the parties periodically verifying the correctness of the values of the correlated random variables by exchanging information between the parties. None of the parties can access nor reveal the values of the correlated random variables stored or received at the other party during the entire process. The process of verifying the correctness of the values of the correlated random variables may be executed once every predefined period of time, for example 5 minutes, 15 seconds, 2.5 hours, 4 days, and the like. In some cases, the time elapsing between subsequent verifying processes may be a function of the vulnerability of the parties or the electrical devices in which the parties reside. The verifying process may be executed by any process desired by a person skilled in the art as long as the values remain confidential to the other parties during the verification process.

Step 125 discloses refreshing the values of the correlated random variables in all the multiple parties. After refreshing, the values of the correlated random variables keep pre-defined requirements, for example mathematical requirements, which enable the values of the correlated random variables to be used as inputs of an MPC process. In some cases, the refreshing is performed locally in each party of the multiple parties after the parties agree on a small seed, without exchanging information with other parties.

Step 130 discloses the parties using the new correlated random variables after verifying a correctness of the values of the correlated random variables and refreshing the values of the correlated random variables.

Figure 2:
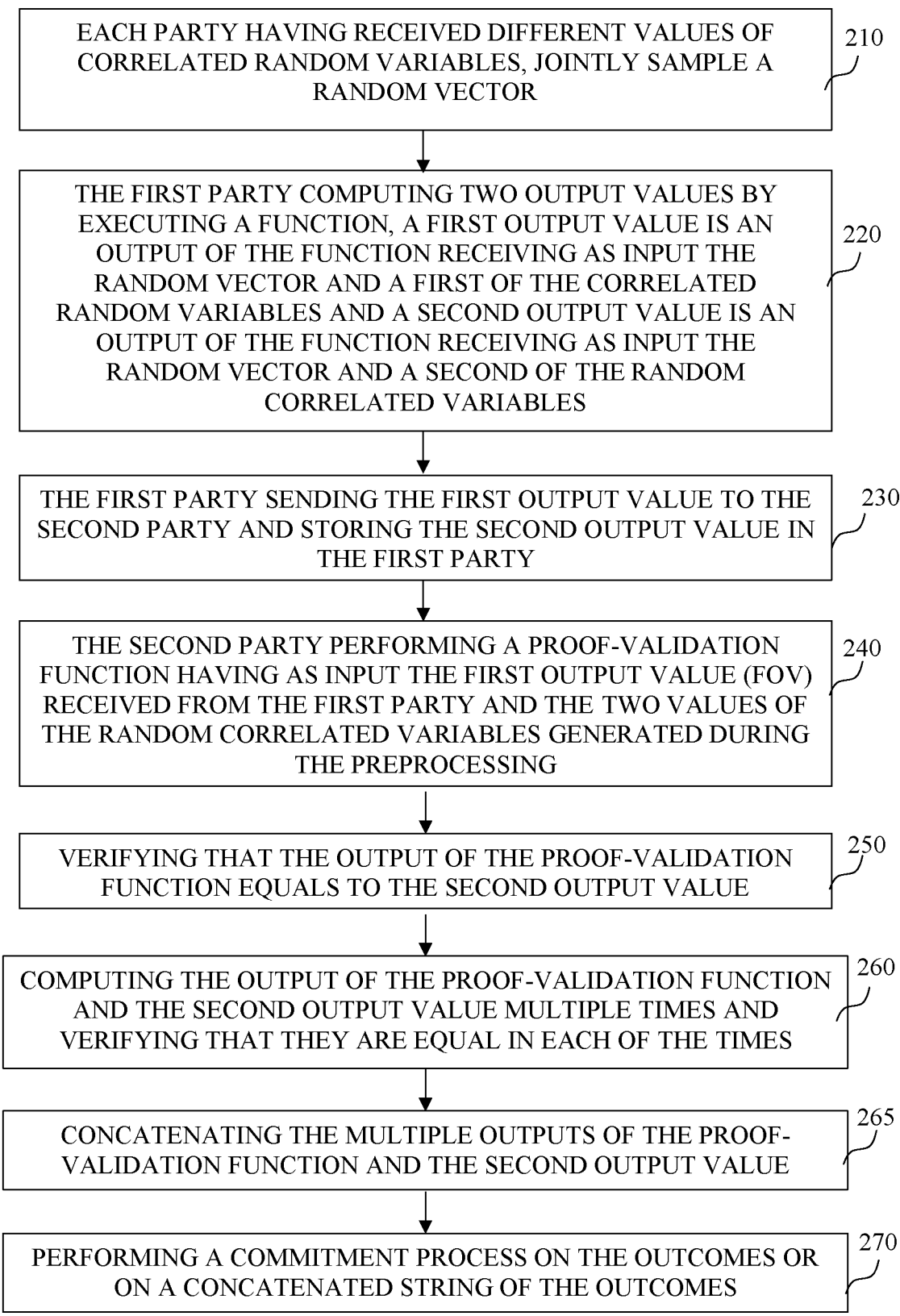
FIG. 2 discloses a method for verifying correctness of pre-processed random correlated variables stored in the multiple parties as generated in the preprocessing MPC phase.

FIG. 2 discloses a computer-implemented method for verifying correctness of pre-processed random correlated variables stored in the multiple parties, according to exemplary embodiments of the present invention.

Step 210 discloses each party receiving different values of random correlated variables as the result of an MPC pre-processing method, or from a trusted party, and jointly sampling a random vector. For example, the first party $P_1$ receives values T and B and the second party $P_2$ receives values $\Delta$ and K. In addition to the values of random correlated variables, the parties $P_1$ and $P_2$ also receive a random vector RV. In some cases, the values of the random correlated variables represent set of values. For example, T may be assembled of a set of N values $[T_1, T_2 \ldots T_n]$. In some cases, the value of T may be a function of at least some of the other random correlated variables stored in another party. For example, T may be computed in the MPC pre-processing method as follows: T=K XOR (B*$\Delta$).

The computation of T is thus performed in the MPC preprocessing method where the random correlated variables are generated. In case each of the values of the random correlated variables represents a set of N values, the same formula applies to each value in the set of N values, for example as follows:

$T_1 = K_1$ XOR$(B_1 * \Delta_1)$ to $T_n = K_n$ XOR$(B_n * \Delta_n)$.

Step 220 discloses the first party of the multiple parties computing two output values by executing a function, a first output value is an output of the function receiving as input the random vector RV and a first value T of the correlated random variables generated in the preprocessing phase and a second output value is an output of the function receiving as input the random vector RV and a second value B of the random correlated variables generated in the preprocessing phase. The first output value and the second output value are computed using the same function. The function may be computing an inner value of the two values the function receives as input. For example, the first output value, OV1, may be computed as OV1=<RV, T> and the second output value, OV2, may be computed as OV2=<RV, B>, as T=K XOR (B*$\Delta$).

Step 230 discloses the first party sending a first output value to the second party and storing the second output value in the first party. Sending the first output value may be performed by sending a message over the internet or via another communication technique. The first value is stored in a memory address of the second party.

Step 240 discloses the second party performing a proof-validation function having as input the First Output Value (FOV) received from the first party and the two values of the random correlated variables generated in the preprocessing MPC phase. The output of the proof-validation function may be computed as K XOR ($\Delta$*FOV). The output of the proof-validation function should equal to the second output value computed by the first party, as the second output value may be computed as an inner value (denoted as <a,b>) of the random vector and B.

The second output value SOV equals <RV, T>,
which equals <RV, K xor (B*$\Delta$)>,
which equals <RV, K> xor<RV, B*$\Delta$>,
which equals K xor<B*$\Delta$>*$\Delta$,
which equals K xor FOV*delta, which is the output of the proof-validation function.

Step 250 discloses verifying that the output of the proof-validation function performed by the second party equals to the second output value computed by the first party. Such verification may be performed by comparing the values. However, this may lead to revealing the value of $\Delta$, therefore revealing one of the values of the random correlated variables.

Step 260 discloses computing the output of the proof-validation function and the second output value multiple times and verifying that they are equal in each of the multiple times. Repeating the computation of the proof-validation function and the second output value increases the likelihood that the value is indeed correct, as the first output value may be a single bit. For example, computing the output of the proof-validation function and the second output value may be executed in the range of 10 to 1,000 times. Verifying that the output of the proof-validation function and the second output value are equal multiple times results in performing steps 210-250 multiple times.

Step 265 discloses concatenating the multiple outputs of the proof-validation function and the second output value. For example, defining the output of each proof-validation function as $VF_i$, as i indicates each of the outputs, and in case the proof-validation function is performed 40 times, the concatenated string comprises $VF_1$, $VF_2$, $VF_3$ until $VF_{40}$.

Step 270 discloses performing a commitment process on the outcomes or on a concatenated string of the outcomes. The outcomes are defined as the output of the proof-validation function and the second output value. The commitment process comprising one party of the multiple parties sending a commitment value of its outcome, for example a commitment value of the output of the proof-validation function. Then, the other party sends its outcome, for example a commitment value of the second output value. After both parties sent the commitment values, both parties reveal the values, or a hash of the values, to prevent revealing the shares, such that both parties verify that the outcomes are equal.

Figure 3:
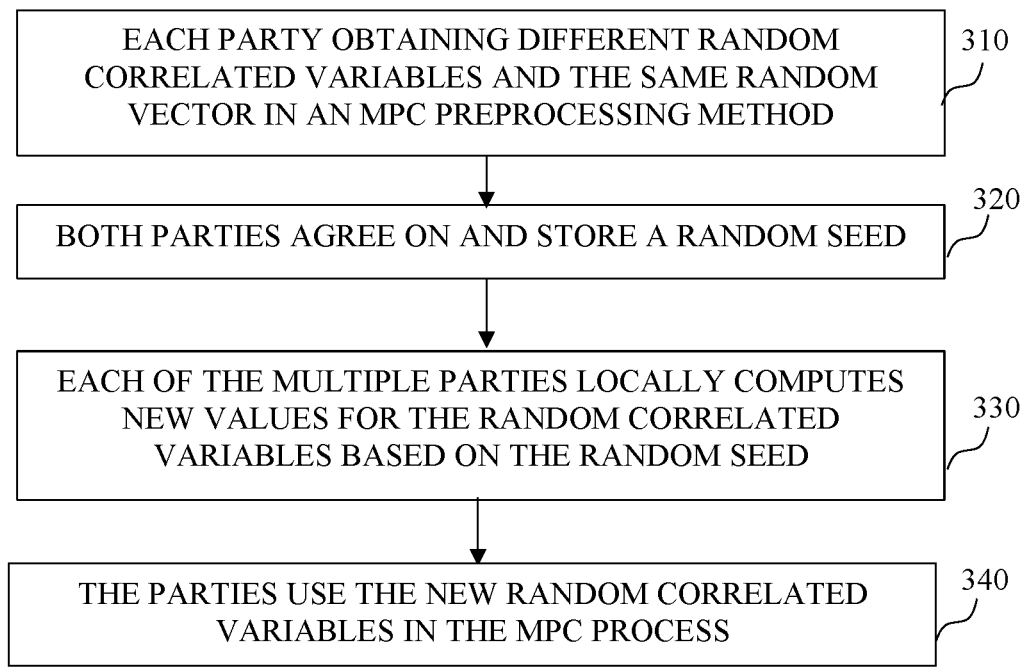
FIG. 3 discloses a method for refreshing values of pre-processed random correlated variables stored in the multiple parties as generated in the preprocessing MPC phase.

FIG. 3 discloses a computer-implemented method for refreshing values of pre-processed random correlated variables stored in the multiple parties and generated in the preprocessing phase, according to exemplary embodiments of the present invention.

The refresh-ensures that the shares are refreshed but the secret remains the same. In case a value of one of the random correlated variables is a function of another value of another one of the random correlated variables, refreshing the values in all the multiple parties should consider the effects of changing one value on the other value. Hence, the following mathematical computation are an example only for changing values of the pre-processed random correlated variables, and such values can be refreshed using other techniques selected by a person skilled in the art.

Step 310 discloses each party receiving different random correlated variables from an MPC preprocessing method and the same random vector. In the example detailed below, the first party $P_1$ receives values T and B and the second party $P_2$ receives values $\Delta$ and K. In addition, the value of T may be computed in the preprocessing phase as follows: T=K XOR (B*$\Delta$).

Step 320 discloses both parties agree on and store a random seed. The random seed may be a binary string having a predefined length. The random seed may be generated by a pseudo random generator desired by a person skilled in the art. The refreshing processes performed in step 330 are performed locally in each of the multiple parties, based on a set of instructions accessed to a processing module of each of the multiple parties.

Step 330 discloses each of the multiple parties locally computes new values for the random correlated variables based on the random seed. In accordance with an exemplary embodiment, the parties compute a first offset from the random seed based on a predefined rule. The first offset is added to 4 in the second party. As a result, the first offset is used to compute the new value of T in the first party, as T is computed by multiplying a formula by $\Delta$. The value of K is refreshed based on a second offset value extracted from the random seed. The second offset value may be identical or different than the first offset value. The new value of T is computed by a (original T+first offset value) XOR (second offset value). The value of B may be a single bit, and the decision whether or not to flip the bit when refreshing the values of the random correlated variables is subject to a random value.

The mathematical explanation is that given two bits a and b, we have that a XOR b=(a XOR 1) XOR (b XOR 1). Given $F(\langle K,\Delta\rangle,B)=K\oplus B*\Delta$, we have the following properties, $$F(\langle\langle K_1\oplus K_2,\Delta\rangle\rangle,B)=F(\langle K_1,\Delta\rangle,B)\oplus K_2 \qquad 1.$$

$$F(\langle K_1,\Delta_1\oplus\Delta_2\rangle,B)=F(\langle K_1,\Delta\rangle,B)\oplus(B\cdot\Delta_2) \qquad 2.$$

$$F(\langle K,\Delta\rangle,B_1)=F(\langle K,\Delta\rangle,B_1\oplus B_2)\oplus B_2\cdot\Delta=F((\langle K+B_2\cdot\Delta,\Delta\rangle,B_1\oplus B_2) \qquad 3.$$

To refresh the shares, we sample fresh $K_2$, $\Delta_2$, $B_2$ and apply the above three transformations sequentially.

Step 340 discloses the parties use the new values of the random correlated variables in the MPC process.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A computer-implemented method performed during a multi-party computation (MPC) process performed between multiple parties, said method comprising:
   the multiple parties executing a pre-processing phase and obtain values of correlated random variables to be used in an MPC process;
   the parties periodically verifying the correctness of the correlated random variables by exchanging information between the multiple parties;
   subsequent to verifying the correctness of the correlated random variables, refreshing the values of the correlated random variables in each of the multiple parties, wherein no party of the multiple parties has access to values of the correlated random variables stored in another party of the multiple parties during the verifying and refreshing processes, and wherein the refreshing of the correlated random variables is performed locally in each of the multiple parties based on a random seed known to each of the multiple parties; and the multiple parties using the correlated random variables during the MPC process after verifying a correctness of the correlated random variables.

2. The method of claim 1, further comprising:

a first party of the multiple parties computing two output values by executing a function, a first output value is an output of the function receiving as input the random vector and a first of the correlated random variables received at the first party and a second output value is an output of the function receiving as input the random vector and a second of the random correlated variables generated during the preprocessing phase;

the first party sending the first output value to the second party and storing the second output value in the first party; and the second party performing a proof-validation function having as input the first output value received from the first party and the two values of the random correlated variables generated during the preprocessing phase.

3. The method of claim 2, further comprising verifying that an output of the proof-validation function equals the first output value.

4. The method of claim 3, further comprising performing a commitment process between the first party and the second party on the output of the proof-validation function equals the first output value.

5. The method of claim 3, further comprising computing output of the proof-validation function equals the first output value multiple times and verifying that the output of the proof-validation function equals the first output value in each of the multiple times.

6. The method of claim 5, further comprising concatenating the multiple outputs of the proof-validation function and the second output value.

7. The method of claim 6, further comprising performing a commitment process between the first party and the second party on the concatenation of the multiple outputs of the proof-validation function and the second output value.

8. The method of claim 1, wherein the refreshing of the correlated random variables comprises the multiple parties agreeing on a random seed and each party of the multiple parties locally computing new values for the correlated random variables based on the random seed and prior values of the correlated random variables.

9. The method of claim 1, further comprising the multiple parties performing an MPC process using the new values for the correlated random variables.

10. The method of claim 1, wherein each party of the multiple parties receives at least two values of correlated random variables.

11. The method of claim 10, wherein one of the values of the correlated random variables sent to the first party is an outcome of a function receiving as input two values of correlated random variables sent to the second party.

12. The method of claim 11, wherein the function comprises multiplying one value stored in each party of the multiple parties and a XOR between the result of the multiplying and another value stored in the second party.

13. A computer-implemented method for executing a pre-processing phase prior to a multi-party computation (MPC) process, the method comprising:

receiving, by multiple parties, values of correlated random variables to be used in an MPC process;

periodically verifying, by the multiple parties, the correctness of the correlated random variables by exchanging information between the multiple parties;

subsequent to verifying the correctness of the correlated random variables, refreshing, by the multiple parties, the values of the correlated random variables in each of the multiple parties, wherein no party of the multiple parties has access to values of the correlated random variables stored in another party of the multiple parties during the verifying and refreshing processes, and wherein the refreshing of the correlated random variables is performed locally in each of the multiple parties based on a random seed known to each of the multiple parties; and performing the MPC process using the correlated random variables after verifying a correctness of the correlated random variables.

14. The method of claim 13, further comprising:

computing, by a first party of the multiple parties, two output values by executing a function, a first output value is an output of the function receiving as input the random vector and a first of the correlated random variables received at the first party and a second output value is an output of the function receiving as input the random vector and a second of the random correlated variables generated during the preprocessing phase;

sending, by the first party, the first output value to the second party and storing the second output value in the first party; and performing, by the second party, a proof-validation function having as input the first output value received from the first party and the two values of the random correlated variables generated during the preprocessing phase.

15. The method of claim 14, further comprising verifying that an output of the proof-validation function equals the first output value.

16. The method of claim 15, further comprising performing a commitment process between the first party and the second party on the output of the proof-validation function equals the first output value.

17. The method of claim 15, further comprising computing output of the proof-validation function equals the first output value multiple times and verifying that the output of the proof-validation function equals the first output value in each of the multiple times.

18. The method of claim 17, further comprising concatenating the multiple outputs of the proof-validation function and the second output value.

19. The method of claim 17, further comprising performing a commitment process between the first party and the second party on the concatenation of the multiple outputs of the proof-validation function and the second output value.

* * * * *